United States Patent
Kusumoto et al.

(10) Patent No.: US 12,240,961 B2
(45) Date of Patent: Mar. 4, 2025

(54) CELLULOSE ACETATE RESIN COMPOSITION

(71) Applicant: Daicel Corporation, Osaka (JP)

(72) Inventors: Masaaki Kusumoto, Tokyo (JP);
Takafumi Kawasaki, Tokyo (JP);
Akihiro Higuchi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/106,507

(22) Filed: Feb. 7, 2023

(65) Prior Publication Data
US 2023/0192993 A1 Jun. 22, 2023

Related U.S. Application Data

(63) Continuation of application No. PCT/JP2021/029071, filed on Aug. 5, 2021.

(30) Foreign Application Priority Data

Aug. 7, 2020 (WO) .................. PCT/JP2020/030471

(51) Int. Cl.
*C08L 1/12* (2006.01)
*C08L 71/10* (2006.01)

(52) U.S. Cl.
CPC .................. *C08L 1/12* (2013.01); *C08L 71/10* (2013.01); *C08L 2203/16* (2013.01)

(58) Field of Classification Search
CPC .......... C08L 1/12; C08L 2203/16; C08L 1/10; C08L 71/10; C08K 5/1036; C08K 5/103; C08K 5/06
See application file for complete search history.

(56) References Cited

U.S. PATENT DOCUMENTS

2004/0247889 A1* 12/2004 Nakajima .................. C08B 3/06
428/480
2014/0234640 A1* 8/2014 Kohno .................... B29C 55/12
264/129

FOREIGN PATENT DOCUMENTS

| CN | 111116997 A | | 5/2020 | | |
|---|---|---|---|---|---|
| CN | 111138721 A | * | 5/2020 | ............... | B29D 7/01 |
| JP | 8-53575 A | | 2/1996 | | |
| JP | 11-255959 A | | 9/1999 | | |
| JP | 2002-60545 A | | 2/2002 | | |
| JP | 2007-77300 A | | 3/2007 | | |
| JP | 2015-140432 A | | 8/2015 | | |
| JP | 2018-524463 A | | 8/2018 | | |
| WO | WO-2011142388 A1 | * | 11/2011 | ............... | C08K 5/53 |
| WO | 2017/017039 A2 | | 2/2017 | | |

OTHER PUBLICATIONS

English language machine translation of CN-111138721-A; translated Feb. 14, 2024. (Year: 2020).*
Sookne, A. M.; Harris, M. "Polymolecularity and Mechanical Properties of Cellulose Acetate" 1945, Ind. Eng. Chem., vol. 37, pp. 478-482. (Year: 1945).*
Swiergel, J.; Jadzyn, J. "From supramolecular to conventional polymers: polyethylene glycol" 2018, Phys. Chem. Chem. Phys., vol. 20, pp. 6045-6049. (Year: 2018).*
Extended European Search Report issued Jan. 15, 2024 in European Patent Application No. 21852175.5.

* cited by examiner

*Primary Examiner* — Eric Olson
*Assistant Examiner* — Benjamin M Brandsen
(74) *Attorney, Agent, or Firm* — XSENSUS LLP

(57) ABSTRACT

The cellulose acetate resin composition may include: a cellulose acetate having a total degree of acetyl substitution of 1.9 or greater and 2.6 or less; and a plasticizer. The cellulose acetate may have a number average molecular weight of 45000 or greater and a weight average molecular weight of 70000 or greater. The plasticizer may be selected from (1) an ether-based plasticizer in which at least one terminal hydroxyl group of a polyalkylene glycol is etherified, and (2) an ester-based plasticizer in which at least one terminal hydroxyl group of a polyalkylene glycol is esterified. The polyalkylene glycol in the ether-based plasticizer (1) and the ester-based plasticizer (2) may have a degree of polymerization of 3 or greater and less than 10. The plasticizer may not include an aromatic ring in the terminal group.

25 Claims, No Drawings

CELLULOSE ACETATE RESIN COMPOSITION

CROSS-REFERENCE TO RELATED APPLICATIONS

The present application is a continuation of International Application No. PCT/JP2021/029071, filed Aug. 5, 2021, which claims priority to international Application No. PCT/JP2020/030471, filed Aug. 7, 2020, each of which is incorporated herein by reference in its entirety.

TECHNICAL FIELD

The present disclosure relates to a cellulose acetate resin composition. Specifically, the present disclosure relates to a cellulose acetate resin composition for use in melt molding.

BACKGROUND ART

Cellulose acetate has biodegradability and is known to degrade by activated sludge. There has been a demand for biodegradable films and sheets due to growing interest in global environment.

Cellulose acetate has poor heat meltability due to hydrogen bonding resulting from hydroxyl groups remaining in a molecular chain thereof. A melting temperature of cellulose acetate tends to be higher as its total degree of acetyl substitution DS is lower. On the other hand, as the total degree of acetyl substitution of cellulose acetate is higher, crystallinity thereof is higher, and thus the solubility and meltability thereof tend to decrease. Various methods for forming cellulose acetate into a sheet or film through film formation by melting have been investigated.

Patent Document 1 discloses a biodegradable sheet formed from an acetate composition containing cellulose acetate and polyoxyethylene glycol. Patent Document 2 discloses a biodegradable film or sheet including cellulose acetate having a degree of acetyl group substitution from 2.3 to 2.7 and a biodegradable plasticizer as main components. This plasticizer is selected from the group consisting of (1) a compound represented by $H_5C_3$ $(OH)_{3-n}(OOCCH_3)_n$ (0≤n≤3) and (2) a glycerin alkylate, an ethylene glycol alkylate, a polyethylene glycol alkylate having an ethylene repeating unit of 5 or less, an aliphatic monocarboxylic acid alkyl ester, an aliphatic dicarboxylic acid alkyl ester, and an aliphatic tricarboxylic acid alkyl ester.

Patent Document 3 proposes a cellulose acetate-based resin composition obtained by melting and mixing a cellulose acetate having a weight average molecular weight of 100000 to 250000 and an average degree of substitution from 1.0 to 2.5, and a plasticizer having an average molecular weight of 300 or greater, the composition including a region having a glass transition temperature of 200° C. or higher. Patent Document 4 discloses a water-soluble cellulose acetate-based resin composition including a cellulose acetate having a total degree of acetyl substitution from 0.5 to 1.0 and a water-soluble organic additive.

Patent Document 5 describes a composition and a film each containing a cellulose acetate having a degree of acetyl substitution from 1.5 to 2.8 and from 1% to 45% of triethylene glycol or the like as a plasticizer. Patent Document 6 discloses a composition and a film each including a cellulose acetate having a degree of acetyl substitution from 2.0 to 2.6 and a plasticizer. Patent Document 7 discloses a compound in which a terminal of an oxyalkylene group is alkylated or acylated as a plasticizer for a cellulose acetate-based resin.

CITATION LIST

Patent Document

Patent Document 1: JP 8-53575 A
Patent Document 2: JP 2002-60545 A
Patent Document 3: JP 11-255959 A
Patent Document 4: JP 2015-140432 A
Patent Document 5: CN 11113872 A
Patent Document 6: JP 2018-524463 A
Patent Document 7: JP 2007-77300 A

SUMMARY OF DISCLOSURE

Technical Problem

All the compositions disclosed in Patent Documents 1 to 3 are melt molded at a temperature above 200° C. and provide a sheet having a thickness of more than 100 μm. A melting temperature above 200° C. causes a problem of coloration caused by thermal decomposition of cellulose acetate. The resin composition of Patent Document 4 is melt-spun at a temperature lower than 200° C., but includes a cellulose acetate having a low degree of substitution. The composition of an example of Patent Document 5 is melt-molded at a temperature lower than 200° C., but includes a cellulose acetate having a low molecular weight. Patent Document 6 uses a special plasticizer having an aromatic ring whose impact on environment is concerned. Patent Document 7 does not refer to the details of cellulose acetate, and particularly, does not provide a plasticizer suitable for forming cellulose acetate into a thin film.

According to the findings of the present disclosers, a resin composition including a cellulose acetate having a relatively high degree of substitution has insufficient melt fluidity at a temperature lower than 200° C., and provides inadequate elongation and bending flexibility of a melt, thereby making it difficult to form, in particular, a thin film having a thickness of 100 μm or less. Also, there is a desire to further improve strength of the molded article. However, particularly in film formation by melting, the application of a high molecular weight cellulose acetate that is expected to have increased melt viscosity is not easy.

An object of the present disclosure is to provide a cellulose acetate resin composition that can be formed into a film at a melting temperature lower than 200° C.

Solution to Problem

A cellulose acetate composition according to some embodiments of the present disclosure includes: a cellulose acetate having a total degree of acetyl substitution of 1.9 or greater and 2.6 or less; and a plasticizer. This cellulose acetate has a number average molecular weight Mn of 45000 or greater and a weight average molecular weight Mw of 70000 or greater. The plasticizer may be selected from:

(1) an ether-based plasticizer in which at least one terminal hydroxyl group of a polyalkylene glycol is etherified, the polyalkylene glycol has a degree of polymerization of 3 or greater and less than 10, and a terminal group does not include an aromatic ring, and
(2) an ester-based plasticizer in which at least one terminal hydroxyl group of a polyalkylene glycol is esterified, the polyalkylene glycol has a degree of polymerization of 3 or greater and less than 10, and a terminal group does not include an aromatic ring.

Optionally, a total content of the plasticizer in the entire resin composition is 5 wt. % or greater and 50 wt. % or less.

Optionally, the polyalkylene glycol has an alkyleneoxy group having 2 to 4 carbon atoms as a repeating unit.

Optionally, an ether substituent of the ether-based plasticizer is a hydrocarbon group having a molecular weight of 150 or less. Preferably, the hydrocarbon group is an alkyl group.

Optionally, the ester-based plasticizer is a polyalkylene glycol esterified with a carboxylic acid having a molecular weight of 150 or less. Preferably, the carboxylic acid is a saturated fatty acid.

Optionally, the cellulose acetate has a molecular weight distribution Mw/Mn of more than 1.7.

A film according to some embodiments of the present disclosure is obtained using any of the resin compositions described above. The film may have a thickness of 10 μm or greater and 150 μm or less.

Advantageous Effects of Disclosure

The cellulose acetate resin composition according to some embodiments of the present disclosure has a high melt flowability in a temperature range of lower than 200° C., and thus can be easily formed into a thin film, and a film having excellent strength can be obtained. Moreover, the resin composition can be formed into a film at a temperature sufficiently lower than a thermal decomposition temperature of the cellulose acetate, and thus coloration is suppressed. Furthermore, the resin composition has high melt tension, and thus is also applicable to inflation film formation.

DESCRIPTION OF EMBODIMENTS

The present disclosure is described in detail below based on preferable embodiments. Note that each of the configurations, combinations thereof, and the like in each of the embodiments are an example, and addition, omission, replacement, and other changes may be made as appropriate without departing from the spirit of the present disclosure. The present disclosure is not limited by the embodiments and is limited only by the claims.

In the present specification, "from X to Y" indicating a range means "X or greater and Y or less". Also, unless otherwise noted, "ppm" means "ppm by weight".

[Cellulose Acetate Resin Composition]

The cellulose acetate resin composition according to some embodiments of the present disclosure includes cellulose acetate and a plasticizer. The cellulose acetate has a total degree of acetyl substitution of 1.9 or greater and 2.6 or less, has a number average molecular weight Mn of 45000 or greater and a weight average molecular weight Mw of 70000 or greater. The plasticizer is one, or two or more selected from:

(1) an ether-based plasticizer in which at least one terminal hydroxyl group of a polyalkylene glycol is etherified, the polyalkylene glycol has a degree of polymerization of 3 or greater and less than 10, and a terminal group does not include an aromatic ring, and (2) an ester-based plasticizer in which at least one terminal hydroxyl group of a polyalkylene glycol is esterified, the polyalkylene glycol has a degree of polymerization of 3 or greater and less than 10, and a terminal group does not include an aromatic ring.

The plasticizer in which at least one of terminal hydroxyl groups of the polyalkylene glycol is etherified or esterified is blended in the resin composition. The plasticizer is highly compatible with the cellulose acetate having a total degree of acetyl substitution of 1.9 or greater and 2.6 or less, a number average molecular weight Mn of 45000 or greater, and a weight average molecular weight Mw of 70000 or greater. Bleeding out of the plasticizer is suppressed in the resin composition. Furthermore, the resin composition including the plasticizer can be melt-molded at a temperature lower than the thermal decomposition temperature of the cellulose acetate, specifically, lower than 200° C., and coloration caused by a decomposition product can be avoided. The resin composition has a low melt viscosity in a temperature range of lower than 200° C. Therefore, even when a die lip is narrowed to discharge a thin film in the melt extrusion method, the viscosity of the melt does not increase more than necessary, and suitable film formation can be performed.

Further, in the resin composition, the plasticizer in which the terminal hydroxyl group is etherified or esterified is considered to exhibit an effect of improving entanglement between molecular chains of the cellulose acetate at the time of melting. In the resin composition according to the present disclosure, the effect of the plasticizer improves the melt tension without excessively increasing the melt viscosity. Therefore, the melt extruded film can be further stretched and formed into a thin film. Also, film formation by an inflation method, which is difficult to apply to cellulose acetate, can be realized.

From the perspective of obtaining high melt fluidity, an MI value (190° C., 5 kg) of the resin composition of the present disclosure is preferably 6.0 or greater, preferably 7.5 or greater, and more preferably 9.0 or greater. The MI value is measured in accordance with the description of JIS K 7210-1 "Plastics—Determination of the melt mass-flow rate (MFR) and melt volume-flow rate (MVR) of thermoplastics—Part 1: Standard method".

[Plasticizer]

As described above, in the plasticizer blended in the resin composition according to some embodiments of the present disclosure, at least one of the terminal hydroxyl groups of the polyalkylene glycol is etherified or esterified. In particular, the plasticizer is etherified or esterified with a functional group that does not include an aromatic ring. In other words, the plasticizer does not include an aromatic ring in the terminal group. The plasticizer has less adverse effects on the environment caused by an aromatic compound.

The polyalkylene glycol has an alkyleneoxy group as a repeating unit. From the perspective of suppressing degradation during melting, the alkyleneoxy group as the repeating unit preferably has 2 or more carbon atoms. From the perspective of achieving excellent compatibility with the cellulose acetate, the alkyleneoxy group preferably has 4 or less carbon atoms. Examples of such an alkyleneoxy group include an ethyleneoxy group, a propyleneoxy group, and a butyleneoxy group.

From the perspective of obtaining high melt tension, a number of the repeating units in the polyalkylene glycol (hereinafter referred to as degree of polymerization) is 3 or more, and preferably 4 or more. From the perspective of obtaining a low melt viscosity, the degree of polymerization of the polyalkylene glycol is less than 10, preferably 9 or less, and more preferably 8 or less.

In the ether-based plasticizer in which at least one terminal hydroxyl group of the polyalkylene glycol is etherified, a preferred ether substituent is a linear, branched or cyclic hydrocarbon group. An aliphatic hydrocarbon group is preferable, and a saturated aliphatic hydrocarbon group (alkyl group) is more preferable. From the perspective of achieving excellent compatibility with the cellulose acetate, the molecular weight of the hydrocarbon group is preferably 150 or less, more preferably 140 or less, and even more preferably 100 or less.

From the perspective of achieving excellent compatibility with the cellulose acetate, the ether-based plasticizer has a number average degree of polymerization of preferably 10 or less, and more preferably 8 or less. An ether-based plasticizer having a number average degree of polymerization of 3 or greater is preferred, from the perspective of high melt fluidity. The number average degree of polymerization of the ether-based plasticizer is calculated from the number average molecular weight measured by size exclusion chromatography (GPC) using polystyrene as a standard substance.

Specific examples of the ether-based plasticizer used in the resin composition of the present disclosure include triethylene glycol monomethyl ether, triethylene glycol dimethyl ether, tetraethylene glycol monomethyl ether, tetraethylene glycol dimethyl ether, tetraethylene glycol diethyl ether, and polyethylene glycol monomethyl ether. Also, there are exemplified monomethyl ether, monoethyl ether, and dimethyl ether of a polyethylene glycol having a degree of polymerization of 3 or greater and less than 10, and monomethyl ether, monoethyl ether, and dimethyl ether of a polypropylene glycol having a degree of polymerization of 3 or greater and less than 10.

In the resin composition according to some embodiments of the present disclosure, the ester-based plasticizer in which at least one terminal hydroxyl group of the polyalkylene glycol is esterified has a number average degree of polymerization of 2 or greater. The number average degree of polymerization of the ester-based plasticizer is more preferably 3 or greater, from the perspective of suppressing volatilization during melting and improving melt tension. From the perspective of achieving excellent compatibility with the cellulose acetate, an ester-based plasticizer having a number average degree of polymerization of 10 or less is preferred. The number average degree of polymerization of the ester-based plasticizer is calculated from the number average molecular weight measured by size exclusion chromatography (GPC) using polystyrene as a standard substance.

An ester-based plasticizer in which at least one terminal hydroxyl group of the polyalkylene glycol is esterified with a carboxylic acid having a molecular weight of preferably 150 or less and more preferably 130 or less is preferred. From the perspective of reducing environmental load, a preferred carboxylic acid is an aliphatic carboxylic acid (fatty acid). The preferred carboxylic acid may be a saturated fatty acid or an unsaturated fatty acid. The plasticizer is preferably an ester-based plasticizer that is esterified with a saturated fatty acid.

Specific examples of the ester-based plasticizer used in the resin composition of the present disclosure include triethylene glycol monoacetate, triethylene glycol diacetate, triethylene glycol dipropionate, and tetraethylene glycol diacetate.

A content of the plasticizer in the resin composition according to some embodiments of the present disclosure is appropriately adjusted depending on the type of the plasticizer, the physical properties of the cellulose acetate, and the like. The total content of the plasticizer is preferably 5 wt. % or greater, more preferably 10 wt. % or greater, even more preferably 15 wt. % or greater, and particularly preferably wt. % or greater with respect to the entire resin composition, from the perspective that the effect of the plasticizer described above is easily obtained. From the perspective of the strength of the resulting molded article, the total content of the plasticizer is preferably 50 wt. % or less, more preferably 45 wt. % or less, even more preferably 40 wt. % or less, and particularly preferably 35 wt. % or less. The total content of the plasticizer in the resin composition of the present disclosure may be from 10 to 45 wt. %, from 10 to 40 wt. %, from 10 to 35 wt. %, from 15 to 50 wt. %, from 15 to 45 wt. %, from 15 to 40 wt. %, from 15 to 35 wt. %, from 20 to 50 wt. %, from 20 to 45 wt. %, from 20 to 40 wt. %, and from 20 to 35 wt. %. When a plurality of the plasticizers are used in combination, a total amount thereof is preferably adjusted to the above-described numerical range.

[Cellulose Acetate (CA)]

The cellulose acetate having a total degree of acetyl substitution (DS) of 1.9 or greater and 2.6 or less is used in the resin composition according to some embodiments of the present disclosure. From the perspective of water resistance improvement, the total degree of acetyl substitution of the cellulose acetate is preferably 2.0 or greater, and more preferably 2.1 or greater. From the perspective of excellent biodegradability, the total degree of acetyl substitution of the cellulose acetate is preferably 2.56 or less, more preferably 2.50 or less, even more preferably 2.40 or less, still even more preferably 2.30 or less, and particularly preferably 2.26 or less. The total degree of acetyl substitution of the cellulose acetate may be from 1.9 to 2.56, from 1.9 to 2.50, from 1.9 to 2.40, from 1.9 to 2.30, from 1.9 to 2.26, from 2.0 to 2.6, from 2.0 to 2.56, from 2.0 to 2.50, from 2.0 to 2.40, from 2.0 to 2.30, from 2.0 to 2.26, from 2.1 to 2.6, from 2.1 to 2.56, from 2.1 to 2.50, from 2.1 to 2.40, from 2.1 to 2.30, and from 2.1 to 2.26.

The total degree of acetyl substitution (sometimes referred to as average degree of substitution) of the cellulose acetate is determined by converting a combined acetic acid content AV determined according to the method for measuring the combined acetic acid content in ASTM: D-871-96 (Testing methods for cellulose acetate, etc.). This is the most common procedure to determine the degree of substitution of cellulose acetate.

$$DS = 162.14 \times AV \times 0.01/(60.052 - 42.037 \times AV \times 0.01)$$

DS: Total degree of acetyl substitution
AV: Combined acetic acid content (%)

The method for measuring the combined acetic acid content (AV) is as follows.

First, 500 mg of a dried cellulose acetate (sample) is precisely weighed and dissolved in 50 ml of a mixed solvent of ultrapure water and acetone (volume ratio: 4:1), and then 50 ml of a 0.2 N aqueous sodium hydroxide solution is added to saponify the cellulose acetate at 25° C. for 2 hours. Next, 50 ml of 0.2 N hydrochloric acid is added, and an amount of acetic acid released is titrated with a 0.2 N aqueous sodium hydroxide solution (0.2 N normal sodium hydroxide solution) using phenolphthalein as an indicator. Also, a blank test (test without using any sample) is performed by the same method. AV (combined acetic acid content) (%) is then calculated according to the following equation:

$$AV\ (\%) = (A - B) \times F \times 1.201/\text{sample weight (g)}$$

wherein
- A represents a titration volume (ml) of 0.2 N normal sodium hydroxide solution;
- B represents a titration volume (ml) of 0.2 N normal sodium hydroxide solution in blank test; and
- F represents a factor of 0.2 N normal sodium hydroxide solution.

[Molecular Weight and Molecular Weight Distribution of Cellulose Acetate]

The resin composition according to some embodiments of the present disclosure includes a cellulose acetate having a number average molecular weight Mn of 45000 or greater and a weight average molecular weight Mw of 70000 or greater. The resin composition includes a cellulose acetate having a number average molecular weight Mn and a weight average molecular weight Mw within these ranges, a molded article having high strength can be easily obtained by melt molding. From the perspective of improving the strength, the weight average molecular weight Mw of the cellulose acetate is preferably 80000 or greater, more preferably 90000 or greater, and even more preferably 100000 or greater. An upper limit value of the weight average molecular weight Mw is not particularly limited, but is preferably 250000 or less, more preferably 240000 or less, and even more preferably 230000 or less, from the perspective of ease of melt molding.

From the perspective of improving the strength, the number average molecular weight Mn of the cellulose acetate is preferably 50000 or greater, more preferably 55000 or greater, and even more preferably 60000 or greater. An upper limit value of the number average molecular weight Mn is not particularly limited, but is preferably 125000 or less, more preferably 120000 or less, and even more preferably 115000 or less, from the perspective of ease of melt molding.

The molecular weight distribution of the cellulose acetate is evaluated by a ratio (Mw/Mn) of the number average molecular weight Mn to the weight average molecular weight Mw. From the perspective of obtaining high melt fluidity, the molecular weight distribution Mw/Mn of the cellulose acetate is preferably more than 1.7, more preferably 1.8 or greater, even more preferably 2.0 or greater, and particularly preferably 2.1 or greater. From the perspective of the production efficiency of the cellulose acetate, the molecular weight distribution Mw/Mn is preferably 3.5 or less, more preferably 3.2 or less, and even more preferably 3.0 or less.

The cellulose acetate is a semi-synthetic polymer obtained from cellulose as a raw material. A maximum value of the molecular weight of the cellulose acetate is determined by cellulose as a raw material. The cellulose acetate having a large molecular weight distribution Mw/Mn can be obtained by performing hydrolysis in as short a time as possible in a production method which will be described later. In addition, a cellulose acetate having a large molecular weight distribution Mw/Mn can be obtained using celluloses having different molecular weights as traw materials. Furthermore, the molecular weight distribution Mw/Mn can also be increased by mixing a plurality of cellulose acetate flakes different in median value of the degree of polymerization. The cellulose acetate of which the molecular weight distribution Mw/Mn is generally 3.5 or less can be obtained by adjusting the reaction conditions in a method for producing cellulose acetate which will be described below. For obtaining a molecular weight distribution Mw/Mn of more than 3.5, a method of mixing a plurality of celluloses as raw materials, or a method of mixing a plurality of cellulose acetate flakes, is effective.

The molecular weight and molecular weight distribution of the cellulose acetate can be determined by known methods. Specifically, the molecular weight and molecular weight distribution of the cellulose acetate are determined by performing size exclusion chromatography (GPC) measurement using the following apparatus under the following conditions (GPC-light scattering method).

- Apparatus: "SYSTEM-21H", GPC available from Shodex
- Solvent: acetone
- Column: two GMHxl (Tosoh Corporation), guard column (TSK gel guard column HXL-H available from Tosoh Corporation)
- Flow rate: 0.8 ml/min
- Temperature: 29° C.
- Sample concentration: 0.25% (wt/vol)
- Injection volume: 100 µl
- Detection: MALLS (multi-angle light scattering detector) ("DAWN-EOS" available from Wyatt Technology Corporation) Reference material for MALLS calibration: PMMA (molecular weight: 27600)

[Viscosity-Average Degree of Polymerization (DPv) of Cellulose Acetate]

A viscosity-average degree of polymerization (DPv) of the cellulose acetate used in some embodiments of the resin composition of the present disclosure is not particularly limited, but is preferably 10 or greater and 400 or less. A resin composition including a cellulose acetate having a viscosity-average degree of polymerization within this range is excellent in melt moldability. From this perspective, the viscosity-average degree of polymerization is more preferably 15 or greater and 300 or less, and even more preferably 20 or greater and 200 or less.

The viscosity-average degree of polymerization (DPv) is determined based on the limiting viscosity number ($[\eta]$, unit: $cm^3/g$) of cellulose acetate.

The limiting viscosity number ($[\eta]$, unit: $cm^3/g$) is determined in accordance with JIS-K-7367-1 and ISO 1628-1. Specifically, the limiting viscosity number is determined by preparing a sample solution in which dimethyl sulfoxide (DMSO) is used as a solvent, measuring the logarithmic relative viscosity at 25° C. using an Ubbelohde-type viscometer of size number 1C, and dividing the logarithmic relative viscosity at 25° C. by the concentration of the sample solution.

Using the obtained limiting viscosity number $[\eta]$, the viscosity-average molecular weight is calculated by the following equation in accordance with the literature of Kamide et al. (Polymer Journal, 13, 421-431 (1981)).

$$\text{Viscosity-average molecular weight} = (\text{limiting viscosity number}[\eta]/0.171)(1/0.61)$$

Using the calculated viscosity-average molecular weight, the viscosity-average degree of polymerization (DPv) was determined by the following equation.

$$\text{Viscosity-average degree of polymerization } (DPv) = \text{viscosity-average molecular weight}/(162.14 + 42.037 \times DS)$$

In the equation, DS is the total degree of acetyl substitution described above.

Method for Producing Cellulose Acetate

The cellulose acetate having a total degree of acetyl substitution of 1.9 or greater and 2.6 or less, a number average molecular weight of 45000 or greater, and a weight average molecular weight of 70000 or greater can be produced by a known method for producing cellulose acetate. Examples of such a production method include what is called an acetic acid method in which acetic anhydride is used as an acetylating agent, acetic acid as a diluent, and sulfuric acid as a catalyst. The basic processes of the acetic acid method include: (1) pretreatment including grinding/disintegrating a pulp raw material (soluble pulp) having a relatively high α-cellulose content and then spraying acetic acid and mixing them; (2) acetylation including reacting the pretreated pulp from (1) with a mixed acid containing acetic anhydride, acetic acid, and an acetylation catalyst (e.g., sulfuric acid); (3) aging including hydrolyzing cellulose acetate to form cellulose acetate having a desired combined acetic acid content; and (4) post-treatment including precipitating the cellulose acetate to separate it from the reaction solution after completion of the hydrolysis reaction, then purifying, stabilizing, and drying the cellulose acetate. The total degree of acetyl substitution can be adjusted by adjusting the conditions of aging (conditions, such as time and temperature).

[Method for Producing Resin Composition]

The resin composition according to some embodiments of the present disclosure can be obtained by melt-kneading the cellulose acetate having a total degree of acetyl substitution of 1.9 or greater and 2.6 or less, a number average molecular weight of 45000 or greater, and a weight average molecular weight of 70000 or greater, and the above-described plasticizer. Preferably, the resin composition is obtained by mixing the cellulose acetate and the plasticizer, and then melt-kneading the mixture. By mixing before melt-kneading, the plasticizer and the cellulose acetate are more uniformly mixed with each other in a short time to homogenize the resulting kneaded product, so that a resin composition with improved melt fluidity and processing accuracy is obtained.

A known mixer such as a Henschel mixer can be used for mixing the cellulose acetate and the plasticizer. Dry mixing or wet mixing may be used. In using a mixer such as a Henschel mixer, the temperature in the mixer is preferably a temperature at which the cellulose acetate does not melt, for example, in a range of 20° C. or higher and lower than 200° C.

An extruder such as a twin-screw extruder can be used for melt-kneading the cellulose acetate and the plasticizer or melt-kneading after mixing the cellulose acetate and the plasticizer. From the perspective of uniformity of the kneaded product and suppression of degradation due to heating, the kneading temperature (cylinder temperature) of the extruder is preferably 160° C. or higher and 230° C. or lower, and more preferably 170° C. or higher and 210° C. or lower. A melting point of the cellulose acetate is approximately from 230° C. to 280° C. depending on the degree of substitution, and is close to the degradation temperature of the cellulose acetate, and thus it is usually difficult to perform melt kneading in this temperature range. However, a plasticizing temperature of the resin composition of the present disclosure is lowered by the plasticizer, and thus a sufficiently uniform kneaded product can be obtained at a temperature of 230° C. or lower. For example, when melt kneading is performed using a twin-screw extruder, the kneading temperature (also referred to as cylinder temperature) may be 200° C. The kneaded product may be extruded into a strand shape from a die attached to the tip of the twin-screw extruder and then hot-cut into pellets. Here, the die temperature may be approximately from 200° C. to 220° C.

An amount of the plasticizer blended with respect to the entire resulting resin composition is preferably 5 wt. % or greater and 50 wt. % or less. When two or more types of plasticizers are blended, a total amount thereof is preferably 5 wt. % or greater and 50 wt. % or less. As long as the effects of the present disclosure are not inhibited, a plasticizer other than the plasticizer described above may be blended in the resin composition. A known additive such as a colorant, an ultraviolet absorber, a light stabilizer, an antioxidant, a heat stabilizer, an optical property modifier, a fluorescent brightener, and a flame retardant may be blended.

[Film]

From another perspective, one embodiment of the present disclosure relates to a film using the cellulose acetate resin composition described above. A film obtained by using the resin composition of some embodiments of the present disclosure in a film formation method by melting, which has been difficult, is thin and is not colored due to a thermal decomposition product. Preferably, the film has a thickness of 150 μm or less, more preferably 10 μm or greater and 150 μm or less, even more preferably 10 μm or greater and 100 μm or less, and particularly preferably 10 μm or greater and 90 μm or less. As will be described below, the use of stretching or an inflation method after melt extrusion makes it possible to reduce the thickness of the film to 10 μm or greater and 50 μm or less, and further 10 μm or greater and 30 μm or less, depending on the application.

The film obtained using the resin composition according to some embodiments of the present disclosure is excellent in marine biodegradability. Preferably 40 wt. % or greater, more preferably 50 wt. % or greater, and particularly preferably 60 wt. % or greater of an organic carbon content is decomposed into $CO_2$ within 180 days in the ocean. The marine degradability can be measured by the method according to ASTM D6691.

[Film Formation Method]

The film according to one embodiment of the present disclosure is produced by the film formation method by melting without using a solvent or plasticizer having a great environmental load. In particular, the film is formed by melting the resin composition of the present disclosure under heating, and extruding the resulting melt through a press or T-die. The melting temperature is preferably 210° C. or lower, more preferably 200° C. or lower, and even more preferably 190° C. or lower. From the perspective of ease of film formation, a preferred melting temperature is 160° C. or higher.

For example, an unstretched film is obtained by extruding a melt through a T-die onto a roll adjusted to a predetermined temperature using a known melt extruder, and solidifying the extruded melt. The changes of the melting temperature and a die lip adjust the film thickness. By increasing a roll speed after die extrusion, a thinner stretched film can be obtained.

The film of the present disclosure may be obtained by the inflation method. In the inflation method, a film can be formed into a tubular shape. By melt-cutting this tube with a melt cutting seal, a bag with a handle can be easily formed. Through film formation by an inflation method using the resin composition of the present disclosure having excellent biodegradability, the film can be formed into a plastic bag or garbage bag having a low environmental load.

The resin composition according to some embodiments of the present disclosure can be suitably used as base materials for, for example, tableware, packaging containers, trays, agricultural materials, fishery materials, OA parts, home electric appliance parts, automobile members, daily goods, and stationery.

EXAMPLES

The effects of the present disclosure will be clarified by the examples below, but the present disclosure should not be construed as being limited based on the description of the examples.

[Test 1: Plasticity Evaluation Test]

Example 1-1

75 parts by weight of cellulose acetate (available from Daicel Corporation: total degree of acetyl substitution DS=2.45, number average molecular weight Mn=85000, weight average molecular weight Mw=190000, Mw/Mn=2.2) and 25 parts by weight of triethylene glycol diacetate (available from TCI, molecular weight: 234) as a plasticizer were blended in a dry state, dried at 80° C. for 3 hours or more, further stirred and mixed using a Henschel mixer, a mixture of the cellulose acetate and the plasticizer was obtained. The resulting mixture was fed to a twin-screw extruder (trade name "PCM30" available from Ikegai Corp., cylinder temperature: 210° C., die temperature: 210° C.), melt-kneaded, extruded, pelletized, and a kneaded product was formed.

Examples 1-2 to 1-3 and Comparative Examples 1-1 to 1-6

Kneaded products were each obtained in the same manner as in Example 1-1 except that the plasticizer was changed as shown in Table 1-2 below.

[Evaluation of Plasticity]

The transparency of the kneaded products of Examples 1-1 to 1-3 and Comparative Examples 1-1 to 1-6 was visually observed. The kneaded product in which no opaque portion was observed was evaluated as having high plasticity (o), and the kneaded product in which even a slight opaque portion was observed was evaluated as having low plasticity (x). The evaluation results are shown in Tables 1-2 below.

[MFR Measurement]

The MFRs (g/10 min) of the kneaded products of Examples 1-1 to 1-3 and Comparative Examples 1-1 to 1-4, which were evaluated as having high plasticity, were measured under conditions of a temperature of 190° C. and a load of 5 kg, in accordance with JIS K 7210-1 "Plastics-Determination of the melt mass-flow rate (MFR) and melt volume-flow rate (MVR) of thermoplastics-Part 1: Standard method". A melt indexer (available from Toyo Seiki Co., Ltd.) was used for measurement. The obtained results are shown in Table 1-2 below, as MI values (190° C., 5 kg). In addition, the state of the strand obtained during the MFR measurement was observed, and the strand having a uniform surface was evaluated as good (o), and the strand having oily matter adhesion on the surface was evaluated as poor (x). Comparative Examples 1-5 had low melt fluidity, and thus could not be measured under the same conditions.

TABLE 1

|  | Example 1-1 | Example 1-2 | Example 1-3 | Comparative Example 1-1 | Comparative Example 1-2 | Comparative Example 1-3 |
| --- | --- | --- | --- | --- | --- | --- |
| Plasticizer | Triethylene glycol diacetate | Tetraethylene glycol dimethyl ether | Polyethylene glycol monomethyl ether 350 | Diethylene glycol dibenzoate | Triacetin | Triethylene glycol diacetate |
| Molecular weight | 234 | 222 | 350 | 314 | 218 | 190 |
| Average degree of polymerization | 3.0 | 4.0 | 7.2 | 2.0 | — | 2.0 |
| Evaluation of kneaded product (210° C.) |  |  |  |  |  |  |
| Plastic MFR measurement | o | o | o | o | o | o |
| MI value (190° C., 5 kg) | 13.2 | 12.0 | 9.1 | 3.0 | 2.0 | 6.0 |
| Strand state | o | o | o | o | o | o |

TABLE 2

|  | Comparative Example 1-4 | Comparative Example 1-5 | Comparative Example 1-6 |
| --- | --- | --- | --- |
| Plasticizer | Polyethylene glycol 400 | Polyethylene glycol monomethyl ether 550 | Polyethylene glycol 1000 |
| Molecular weight | 400 | 550 | 1000 |
| Average degree of polymerization | 8.7 | 11.8 | 22.3 |
| Evaluation of kneaded product (210° C.) |  |  |  |
| Plastic MFR measurement | o | o | x |
| MI value (190° C., 5 kg) | 2.1 | Not measurable | — |
| Strand state | x | — | — |

Test 2: Film Preparation Test

Example 2-1

Cellulose acetate (available from Daicel Corporation: total degree of acetyl substitution DS=2.45, number average molecular weight Mn=85000, weight average molecular weight Mw=190000, Mw/Mn=2.2) and triethylene glycol diacetate (available from TCI, molecular weight: 234) were melt-kneaded to obtain pellets in the same manner as in Example 1-1. The obtained pellets were charged into a melt extruder (twin-screw extruder) controlled to the temperature indicated in Table 3 below, the molten resin composition was extruded from the T-die onto the roll, and thus an unstretched film was formed. The obtained film was colorless and transparent, and its thickness was 100 μm.

Example 2-2

A film (colorless and transparent) having a thickness of 100 μm was obtained in the same manner as in Example 2-1, except that cellulose acetate (available from Daicel Corporation: total degree of acetyl substitution DS=2.15, number average molecular weight Mn=81000, weight average molecular weight Mw=180000, Mw/Mn=2.2) was used.

Examples 2-3, 2-4 and 2-9 to 2-12 and Comparative Examples 2-1 to 2-4

Films (colorless and transparent) having a thickness of 100 μm were obtained in the same manner as in Examples 2-1 and 2-2, except that the cellulose acetate and plasticizer specifications were as shown in Tables 3 and 4 below. Note that, cellulose acetate (available from Daicel Corporation: total degree of acetyl substitution DS=2.45, number average molecular weight Mn=85000, weight average molecular weight Mw=190000, Mw/Mn=2.2) was used in Examples 2-3, 2-9, and 2-11, and Comparative Examples 2-1 to 2-4, and cellulose acetate (available from Daicel Corporation: total degree of acetyl substitution DS=2.15, number average molecular weight Mn=81000, weight average molecular weight Mw=180000, Mw/Mn=2.2) was used in Examples 2-4, 2-10, and 2-12. In Comparative Examples 2-1 to 2-4, an insoluble matter was observed in the obtained molded product, and it was confirmed that the formation of a film having a homogeneous thickness was difficult at lower than 200° C.

Examples 2-5 to 2-8 and 2-13 to 2-16

Stretched films having a thickness shown in Table 3 below were obtained in the same manner as in Examples 2-1 and 2-2, except that the cellulose acetate and plasticizer specifications were as shown in Tables 3 and 4 below and that the roll speed after extrusion from the T-die was changed. Note that, cellulose acetate (available from Daicel Corporation: total degree of acetyl substitution DS=2.45, number average molecular weight Mn=85000, weight average molecular weight Mw=190000, Mw/Mn=2.2) was used in Examples 2-5, 2-6, 2-13 and 2-14, and that cellulose acetate (available from Daicel Corporation: total degree of acetyl substitution DS=2.15, number average molecular weight Mn=81000, weight average molecular weight Mw=180000, Mw/Mn=2.2) was used in Examples 2-7, 2-8, 2-15, and 2-16.

Comparative Examples 2-5 to 2-8

In Comparative Examples 2-5 and 2-7, films (colorless and transparent) having a thickness of 100 μm were obtained in the same manner as in Comparative Example 2-1, except that the cellulose acetate specification was as shown in Table 4 below, and that the temperature of the melt extruder was controlled to 210° C., but the workability was inferior because of a high melt viscosity. In Comparative Examples 2-6 and 2-8, an attempt was made to change the roll speed after extrusion from the T die and form a thin film, but many breakages occurred in the obtained films, and thus the films could not be put to practical use. Note that, cellulose acetate (available from Daicel Corporation: total degree of acetyl substitution DS=2.45, number average molecular weight Mn=85000, weight average molecular weight Mw=190000, Mw/Mn=2.2) was used in Comparative Examples 2-5 and 2-6, and that cellulose acetate (available from Daicel Corporation: total degree of acetyl substitution DS=2.15, number average molecular weight Mn=81000, weight average molecular weight Mw=180000, Mw/Mn=2.2) was used in Comparative Examples 2-7 and 2-8.

TABLE 3

| | Composition | | | | Temperature control unit | | | Film | |
| | Cellulose Acetate | | Plasticizer | | Zone former half | Zone latter half | | | |
| | Degree of substitution DS | Parts by weight | Type | Parts by weight | part ° C. | part ° C. | Die ° C. | Characteristic | Thickness μm |
|---|---|---|---|---|---|---|---|---|---|
| Example 2-1 | 2.45 | 75 | Triethylene glycol diacetate | 25 | 190 | 190 | 190 | Colorless and transparent | 100 |
| Example 2-2 | 2.15 | 75 | Triethylene glycol diacetate | 25 | 190 | 190 | 190 | Colorless and transparent | 100 |
| Example 2-3 | 2.45 | 67 | Triethylene glycol diacetate | 33 | 170 | 170 | 170 | Colorless and transparent | 100 |
| Example 2-4 | 2.15 | 67 | Triethylene glycol diacetate | 33 | 170 | 170 | 170 | Colorless and transparent | 100 |
| Example 2-5 | 2.45 | 75 | Triethylene glycol diacetate | 25 | 190 | 190 | 190 | Colorless and transparent | 50 |
| Example 2-6 | 2.45 | 75 | Triethylene glycol diacetate | 25 | 190 | 190 | 190 | Colorless and transparent | 30 |
| Example 2-7 | 2.15 | 75 | Triethylene glycol diacetate | 25 | 190 | 190 | 190 | Colorless and transparent | 50 |
| Example 2-8 | 2.15 | 75 | Triethylene glycol diacetate | 25 | 190 | 190 | 190 | Colorless and transparent | 30 |
| Example 2-9 | 2.45 | 75 | Tetraethylene glycol dimethyl ether | 25 | 190 | 190 | 190 | Colorless and transparent | 100 |
| Example 2-10 | 2.15 | 75 | Tetraethylene glycol dimethyl ether | 25 | 190 | 190 | 190 | Colorless and transparent | 100 |
| Example 2-11 | 2.45 | 67 | Tetraethylene glycol dimethyl ether | 33 | 170 | 170 | 170 | Colorless and transparent | 100 |

TABLE 3-continued

| | Composition | | | | Temperature control unit | | | Film | |
|---|---|---|---|---|---|---|---|---|---|
| | Cellulose Acetate | | Plasticizer | | Zone former half part °C. | Zone latter half part °C. | Die °C. | Characteristic | Thickness μm |
| | Degree of substitution DS | Parts by weight | Type | Parts by weight | | | | | |
| Example 2-12 | 2.15 | 67 | Tetraethylene glycol dimethyl ether | 33 | 170 | 170 | 170 | Colorless and transparent | 100 |
| Example 2-13 | 2.45 | 75 | Tetraethylene glycol dimethyl ether | 25 | 190 | 190 | 190 | Colorless and transparent | 50 |
| Example 2-14 | 2.45 | 75 | Tetraethylene glycol dimethyl ether | 25 | 190 | 190 | 190 | Colorless and transparent | 30 |
| Example 2-15 | 2.15 | 75 | Tetraethylene glycol dimethyl ether | 25 | 190 | 190 | 190 | Colorless and transparent | 50 |
| Example 2-16 | 2.15 | 75 | Tetraethylene glycol dimethyl ether | 25 | 190 | 190 | 190 | Colorless and transparent | 30 |

TABLE 4

| | Composition | | | | Temperature control unit | | | Film | |
|---|---|---|---|---|---|---|---|---|---|
| | Cellulose Acetate | | Plasticizer | | Zone former half part °C. | Zone latter half part °C. | Die °C. | Characteristic | Thickness μm |
| | Degree of substitution DS | Parts by weight | Type | Parts by weight | | | | | |
| Comparative Example 2-1 | 2.45 | 75 | Triacetin | 25 | 190 | 190 | 190 | Insoluble matter present | — |
| Comparative Example 2-2 | 2.45 | 75 | Triethylene glycol diacetate | 25 | 190 | 190 | 190 | Insoluble matter present | — |
| Comparative Example 2-3 | 2.45 | 67 | Triacetin | 33 | 170 | 170 | 170 | Insoluble matter present | — |
| Comparative Example 2-4 | 2.45 | 67 | Triethylene glycol diacetate | 33 | 170 | 170 | 170 | Insoluble matter present | — |
| Comparative Example 2-5 | 2.45 | 75 | Triacetin | 25 | 210 | 210 | 210 | Colorless and transparent | 100 |
| Comparative Example 2-6 | 2.45 | 75 | Triacetin | 25 | 210 | 210 | 210 | Colorless and transparent | — |
| Comparative Example 2-7 | 2.15 | 75 | Triacetin | 25 | 210 | 210 | 210 | Colorless and transparent | 100 |
| Comparative Example 2-8 | 2.15 | 75 | Triacetin | 25 | 210 | 210 | 210 | Colorless and transparent | — |

[Test 3: Inflation Film Preparation Test]

Example 3-1

In the same manner as in Example 2-3, 67 parts by weight of cellulose acetate (available from Daicel Corporation: total degree of acetyl substitution DS=2.45, number average molecular weight Mn=85000, weight average molecular weight Mw=190000, Mw/Mn=2.2) and 33 parts by weight of triethylene glycol diacetate (available from TCI, molecular weight: 234) were blended in a dry state, dried at 80° C. for 3 hours or more, further stirred and mixed using a Henschel mixer, and a mixture of the cellulose acetate and the plasticizer was obtained. The resulting mixture was fed to a twin-screw extruder (trade name "PCM30" available from Ikegai Corp., cylinder temperature: 170° C., die temperature: 170° C.), melt-kneaded, and extruded, and thus pellets were obtained. The pellets were charged into an inflation molding machine (die diameter: 30 mm, lip width: 1 mm) set to a temperature of the Zone former half part of 170° C., a temperature of the Zone latter half part of 170° C., and a die temperature of 170° C., and an inflation film having a thickness of 100 μm and a fold width of 80 mm was obtained. The film formation state was good, and the resulting film was colorless and transparent.

Examples 3-2 to 3-4

Inflation films having a thickness of 100 μm and a fold width of 80 mm were obtained in the same manner as in Example 3-1, except that cellulose acetate and plasticizer specifications were as shown in Table 5 below. The film formation state was good in all the cases, and the resulting films were colorless and transparent. Note that, in Examples 3-2 and 3-4, cellulose acetate (available from Daicel Corporation: total degree of acetyl substitution DS=2.15, number average molecular weight Mn=81000, weight average molecular weight Mw=180000, Mw/Mn=2.2) was used.

TABLE 5

| | Composition | | | | Temperature control unit | | | Film | | |
|---|---|---|---|---|---|---|---|---|---|---|
| | Cellulose Acetate | | Plasticizer | | Zone former half part °C | Zone latter half part °C. | Die °C. | Characteristic | Thickness μm | Fold width mm |
| | Degree of substitution DS | Parts by weight | Type | Parts by weight | | | | | | |
| Example 3-1 | 2.45 | 67 | Triethylene glycol diacetate | 33 | 170 | 170 | 170 | Colorless and transparent | 100 | 80 |
| Example 3-2 | 2.15 | 67 | Triethylene glycol diacetate | 33 | 170 | 170 | 170 | Colorless and transparent | 100 | 80 |
| Example 3-3 | 2.45 | 67 | Tetraethylene glycol dimethyl ether | 33 | 170 | 170 | 170 | Colorless and transparent | 100 | 80 |
| Example 3-4 | 2.15 | 67 | Tetraethylene glycol dimethyl ether | 33 | 170 | 170 | 170 | Colorless and transparent | 100 | 80 |

[Test 4: Strength Evaluation Test]

Examples 4-1 to 4-4 and Comparative Examples 4-1 to 4-4

First, cellulose acetate and a plasticizer were blended in a dry state with the composition shown in Table 6 below, dried at 80° C. for 3 hours or more, further stirred and mixed using a Henschel mixer, and thus a mixture of the cellulose acetate and the plasticizer was obtained. The resulting mixture was fed to a twin-screw extruder (trade name "PCM30" available from Ikegai Corp., cylinder temperature: 210° C., die temperature: 210° C.), melt-kneaded, and extruded, and thus pellets of the kneaded product were obtained.

(Preparation of Dumbbell Piece)

A dumbbell-shaped A-type test piece (thickness: 4 mm) described in ISO527 was prepared by injection molding (temperature: 210° C.) the pellets of the examples and comparative examples.

(Preparation of Film-Shaped Test Piece)

The pellets of each of the examples and the comparative examples were charged into a melt extruder (twin-screw extruder), and a film having a thickness of 100 μm was obtained by extruding the molten resin composition from the T-die onto the roll at a temperature of the Zone former half part of 190° C., a temperature of the Zone latter half part of 200° C., and a die temperature of 200° C.

[Tensile Test]

The tensile strength (maximum strength: MPa) of the dumbbell pieces and films of the examples and the comparative examples was measured at room temperature (20° C.±5° C.) in accordance with the method described in ISO527. For measurement, a tensile testing machine available from A&D Company, Limited was used. The test conditions were as follows.

Tensile speed: 50 mm/min

Distance between grips: 115 mm

The calculation results of the average values of five measurements for the samples are shown in Table 6 below. Note that the strength of the film is the maximum strength in the longitudinal direction (extrusion direction).

TABLE 6

| | Composition | | | | | | | Tensile test/maximum strength | |
|---|---|---|---|---|---|---|---|---|---|
| | Cellulose Acetate | | | | | Plasticizer | | Dumbbell piece MPa | Film (longitudinal) MPa |
| | Degree of substitution DS | Mn | Mw | Mw/Mn | Parts by weight | Type | Parts by weight | | |
| Example 4-1 | 2.45 | 85000 | 190000 | 2.2 | 80 | Triethylene glycol diacetate | 20 | 42.3 | 49.2 |
| Example 4-2 | 2.45 | 85000 | 190000 | 2.2 | 80 | Tetraethylene glycol dimethyl ether | 20 | 35.5 | 43.5 |
| Example 4-3 | 2.15 | 81000 | 180000 | 2.2 | 80 | Triethylene glycol diacetate | 20 | 42.7 | 51.9 |
| Example 4-4 | 2.15 | 81000 | 180000 | 2.2 | 80 | Tetraethylene glycol dimethyl ether | 20 | 37.3 | 41.9 |
| Comparative Example 4-1 | 2.45 | 39000 | 65000 | 1.7 | 80 | Triethylene glycol diacetate | 20 | 29.2 | 32.2 |
| Comparative Example 4-2 | 2.45 | 39000 | 65000 | 1.7 | 80 | Tetraethylene glycol dimethyl ether | 20 | 24.4 | 30.1 |
| Comparative Example 4-3 | 2.15 | 38000 | 64000 | 1.7 | 80 | Triethylene glycol diacetate | 20 | 28.7 | 31.1 |

TABLE 6-continued

| | Composition | | | | | | Tensile test/maximum strength | |
|---|---|---|---|---|---|---|---|---|
| | Cellulose Acetate | | | | Plasticizer | | Dumbbell | Film |
| | Degree of substitution DS | Mn | Mw | Mw/Mn | Parts by weight | Type | Parts by weight | piece MPa | (longitudinal) MPa |
| Comparative Example 4-4 | 2.15 | 38000 | 64000 | 1.7 | 80 | Tetraethylene glycol dimethyl ether | 20 | 25.8 | 30.3 |

(Conclusion)

As shown in Table 1-2, it was found that the resin compositions of Examples 1-1 to 1-3 exhibited high plasticity, and exhibited a higher melt fluidity (MI value) than that of the resin compositions of the comparative examples at a temperature 190° C. Also, as shown in Table 3, a favorable film formation by melting could be achieved at a temperature lower than 200° C. using the resin compositions of Examples 2-1 to 2-16. Further, in Examples 2-5 to 2-8 and 2-13 to 2-16, the melts had a high melt tension, and thus could be stretched into a thin film having a thickness of less than 100 μm. On the other hand, as shown in Table 4, the resin compositions of Comparative Examples 2-1 to 2-4 were difficult to form a film at a melting temperature of lower than 200° C. For Comparative Examples 2-5 to 2-8, a film could be formed at a melting temperature of 200° C. or higher, but had poor workability because of a high melt viscosity, and thus could not be made thin. Also, as shown in Table 5, it was confirmed that the resin compositions of the examples were applicable to inflation film formation at lower than 200° C. Furthermore, as shown in Table 6, the resin compositions of the examples were confirmed to have high tensile strength and excellent mechanical properties as compared with those of the comparative examples.

As shown in Tables 1 to 6, the resin compositions of the examples are highly evaluated as compared with the resin compositions of the comparative examples. From this evaluation result, the superiority of the present disclosure is clear.

Industrial Applicability

The resin compositions described above can be applied to various fields using film formation by melting.

The invention claimed is:

1. A resin composition comprising: a cellulose acetate having a total degree of acetyl substitution of 1.9 or greater and 2.5 or less; and a plasticizer,
wherein the cellulose acetate has a number average molecular weight Mn of 45000 or greater, a weight average molecular weight Mw of 70000 or greater, and a molecular weight distribution Mw/Mn of more than 2.2 and 3.5 or less,
the plasticizer is an ester-based plasticizer in which at least one terminal hydroxyl group of a polyalkylene glycol is esterified with a terminal group, the polyalkylene glycol has a degree of polymerization of 3 or greater and less than 10, and the terminal group does not include an aromatic ring, and
a total content of the plasticizer is 25 wt. % or greater and 50 wt. % or less with respect to the entire resin composition.

2. The resin composition according to claim 1, wherein the total content of the plasticizer is 25 wt. % or greater and 35 wt. % or less with respect to the entire resin composition.

3. The resin composition according to claim 1, wherein the polyalkylene glycol has an alkyleneoxy group having 2 to 4 carbon atoms as a repeating unit.

4. The resin composition according to claim 1, wherein the ester-based plasticizer is a polyalkylene glycol esterified with a carboxylic acid having a molecular weight of 150 or less.

5. The resin composition according to claim 4, wherein the carboxylic acid has a molecular weight of 130 or less.

6. The resin composition according to claim 4, wherein the carboxylic acid is a saturated fatty acid.

7. The resin composition according to claim 1, wherein the polyalkylene glycol has a degree of polymerization of 4 or greater and less than 9 in the ester-based plasticizer.

8. The resin composition according to claim 1, wherein the ester-based plasticizer includes triethylene glycol monoacetate, triethylene glycol diacetate, triethylene glycol dipropionate, and/or tetraethylene glycol diacetate.

9. The resin composition according to claim 1, wherein the cellulose acetate has the total degree of acetyl substitution of 2.1 or greater and 2.26 or less.

10. The resin composition according to claim 1, wherein the cellulose acetate has the number average molecular weight Mn of 60000 or greater and 115000 or less.

11. The resin composition according to claim 1, wherein the cellulose acetate has the weight average molecular weight Mw of 100000 or greater and 230000 or less.

12. The resin composition according to claim 1, wherein an MI value of the resin composition is 6.0 or greater.

13. The resin composition according to claim 1, wherein a content of the cellulose acetate is 50 wt. % or greater and 75 wt. % or less with respect to the entire resin composition.

14. The resin composition according to claim 1, wherein 40 wt. % or greater of an organic carbon content of a film made of the resin composition is decomposed into $CO_2$ within 180 days in a marine degradability test according to ASTM D6691.

15. A film having a thickness of 10 μm or greater and 150 μm or less, the film being obtained using the resin composition described in claim 1.

16. A resin composition comprising: a cellulose acetate having a total degree of acetyl substitution of 1.9 or greater and 2.6 or less; and a plasticizer,
wherein the cellulose acetate has a number average molecular weight Mn of 45000 or greater, a weight average molecular weight Mw of 70000 or greater, and a molecular weight distribution Mw/Mn of more than 2.2 and 3.5 or less,
the plasticizer is an ether-based plasticizer in which at least one terminal hydroxyl group of a polyalkylene glycol is etherified with a terminal group, the polyalkylene glycol has a degree of polymerization of 3 or greater and less than 10, and the terminal group does not include an aromatic ring, and a total content of the plasticizer is 25 wt. % or greater and 50 wt. % or less with respect to the entire resin composition.

17. The resin composition according to claim 16, wherein the cellulose acetate has the weight average molecular weight Mw of 100000 or greater.

18. The resin composition according to claim 16, wherein the total content of the plasticizer is 25 wt. % or greater and 35 wt. % or less with respect to the entire resin composition.

19. The resin composition according to claim 16, wherein an ether substituent of the ether-based plasticizer is a hydrocarbon group having a molecular weight of 150 or less.

20. The resin composition according to claim 19, wherein the hydrocarbon group has a molecular weight of 100 or less.

21. The resin composition according to claim 19, wherein the hydrocarbon group is an alkyl group.

22. The resin composition according to claim 16, wherein the polyalkylene glycol has a degree of polymerization of 4 or greater and less than 9 in the ether-based plasticizer.

23. The resin composition according to claim 16, wherein the ether-based plasticizer includes triethylene glycol monomethyl ether, triethylene glycol dimethyl ether, tetraethylene glycol monomethyl ether, tetraethylene glycol dimethyl ether, tetraethylene glycol diethyl ether, and/or polyethylene glycol monomethyl ether.

24. The resin composition according to claim 16, wherein a content of the cellulose acetate is 50 wt. % or greater and 75 wt. % or less with respect to the entire resin composition.

25. The resin composition according to claim 16, wherein 40 wt. % or greater of an organic carbon content of a film made of the resin composition is decomposed into $CO_2$ within 180 days in a marine degradability test according to ASTM D6691.

* * * * *